(12) United States Patent
Socier et al.

(10) Patent No.: US 6,533,326 B1
(45) Date of Patent: Mar. 18, 2003

(54) MULTI-BRANCH FITTING AND METHOD OF FABRICATING

(76) Inventors: Jerry C. Socier, 655 N. Southeast Boutell, Bay City, MI (US) 48708; Roger R. Felske, 812 Russell, Bay City, MI (US) 48708; Allan R. Badour, 825 E. Cass Ave., Munger, MI (US) 48747

( * ) Notice: Subject to any disclaimer, the term of this patent is extended or adjusted under 35 U.S.C. 154(b) by 0 days.

(21) Appl. No.: 09/246,438

(22) Filed: Feb. 8, 1999

(51) Int. Cl.$^7$ .................................................. F16L 9/14
(52) U.S. Cl. ..................... 285/55; 285/133.11; 285/189
(58) Field of Search ............................. 285/55, 133.11, 285/288.1, 288.6, 189; 29/890.148

(56) References Cited

U.S. PATENT DOCUMENTS

| 1,586,691 A | 6/1926 | Murray, Jr. | |
|---|---|---|---|
| 1,596,114 A | 8/1926 | Murray | |
| 1,860,346 A | 5/1932 | Anderson | |
| 3,254,900 A | 6/1966 | Van Nooy | 285/189 |
| 3,965,555 A | 6/1976 | Webster et al. | 29/157 |
| 4,106,797 A | 8/1978 | Michael | 285/156 |
| 4,179,141 A | * 12/1979 | Newman | 285/189 |
| 4,522,432 A | 6/1985 | Press | 285/55 |
| 4,681,349 A | 7/1987 | Press et al. | 285/55 |
| 4,786,088 A | * 11/1988 | Ziu | 285/138 |
| 5,134,852 A | * 8/1992 | Weeks | 285/155 X |
| 5,445,309 A | * 8/1995 | Yamada et al. | 29/890.148 X |
| 5,624,140 A | * 4/1997 | Allen et al. | 29/890.148 X |
| 5,685,571 A | * 11/1997 | Gardner | 285/12 |
| 5,775,736 A | * 7/1998 | Svetlik | 29/890.148 X |

* cited by examiner

Primary Examiner—Suzanne Dino Barrett
(74) Attorney, Agent, or Firm—John J. Swartz

(57) ABSTRACT

A lined multi-branch fitting and method of making a lined multi-branch fitting having a plurality of individual confronting housing members assembled about a one-piece, multi-branch, heat degradable liner. The confronting ends of the metal housing members are welded together via a fillet weld. One of the confronting ends includes a radially inner male insulating projecting strip which abuts the liner and insulates the liner from weld heat applied to the other confronting ends. The other confronting end includes a terminal end slot which receives the male insulating projecting strip; the one confronting end includes a radially outer weld recess for receiving an annular fillet weld bead.

24 Claims, 7 Drawing Sheets

MULTI-BRANCH FITTING AND METHOD OF FABRICATING

BACKGROUND OF THE INVENTION

1. Field of the Invention

This invention relates to a lined multi-branch fitting and method of making a lined multi-branch fitting having a plurality of individual metal housing members which are assembled over a one-piece, multi-branch, heat degradable liner and more particularly to a lined multi-branch fitting having confronting metal housing members which are welded together with a fillet weld and include an insulating projection on one of the housing members received in a complementally formed recess in the other of the housing members for insulating the liner from weld heat applied to the other housing member.

2. Description of the Prior Art and Objects

A lined multi-branch fitting constructed according to the present invention is particularly adapted for use in coupling metal pipes lined with plastic or glass such as that utilized in the transporting chemicals in the chemical transport industry. The fittings constructed according to the present invention couple elongate runs of piping to transversely disposed fluid distribution lines or laterals which extend off a main run. Such fittings typically are T-shaped fittings although it should be understood that the neck or stack on such fittings can extend at an angle other than 90° to the main run. One such fitting has a T-shaped liner that is molded into a T-shaped metal fitting, but this fitting is expensive and the process of manufacture is time consuming.

Also, relevant to an understanding of the invention is an understanding of the limitations imposed by the types of welds that might be incorporated in coupling adjacent pipe sections together.

One prior art method of coupling lined pipe sections included abutting adjacent ends of pipe sections to be coupled and then "butt-welding" the abutting adjacent ends together. Although such welds are very strong, such welds are relatively more expensive than a fillet weld. Firstly, building and construction codes commonly require that the weld metal in butt welds extend completely through the abutting ends and thus, substantially more time and weld metal is required than is required in a fillet weld. In addition, butt welds must typically be x-rayed and spot checked for quality and such x-raying is expensive. Finally, the butt welding technique requires higher skill than that required for a fillet weld. Accordingly, it is an object of the present invention to provide a multi-branch lined fitting which includes adjacent metal housing parts that are coupled together with fillet welds as opposed to butt welds.

When welding two pieces of metal together, it has been found advantageous to apply more heat to one of the parts than to the other. The problem attendant to doing this, however, is that more heat will be transmitted to the lining by the part having more heat supplied thereto. Accordingly, it is another object of the present invention to reduce the transfer of weld heat transmitted to the adjacent portion of the heat degradable lining disposed therein.

It is further object of the present invention to provide a multi-branch lined fitting of the type described which includes a barrier to inhibit burning of the heat degradable liner disposed in the fitting.

It has been found, according to the present invention, that inserting an insulator between an external portion of one of the housing parts and an interior lining is advantageous in preventing heat degradation of the lined material. Accordingly, it is an object of the present invention to provide a lined multi-branch fitting of the type described including an insulator which is disposed adjacent the interior portion of one of the fitting parts and the exterior portion thereof.

It has been found according to the present invention, that an adequate insulator can comprise a female slot on the radially inner portion of the part to which the primary weld heat is to be applied and a male projection on the other metal housing member to be connected thereto which is received by the slot. Accordingly, it is another object of the present invention to provide a multi-branch lined fitting of the type described wherein an insulator is integrally provided on one of the metal housing members for being received in a complementally formed notch in the other housing member.

It is another object of the present invention to provide a lined multi-branch fitting of the type described wherein the metal housing member, including the male insulating projection, comprises a groove in a radially outer portion thereof for receiving weld metal for forming a fillet weld bead to couple the metal housing parts together.

It is another object of the present invention to provide a multi-branch fitting of the type described which couples two metal sections, each having a hollow cylinder and a transversely disposed substantially semi-cylindrical metal half stack mating with the other half stack to form a cylindrical stack transverse to the hollow cylinder, with a new and novel insulating fillet welded joint therebetween.

It is another object of the present invention to provide a multi-branch lined fitting of the type described including a metal housing comprised of two axially aligned hollow cylinders and a transversely disposed metal cylindrical stack with the stacks having confronting terminal ends welded together via a fillet weld.

It is a further object of the present invention to provide a T-type fitting of the type described including a heat insulator comprising radially inner cooperating male and female parts at the junction of the metal housing members.

The following patents, although not disclosing or remotely suggesting the concepts, structure and method disclosed and claimed herein, were selected during a preliminary patentability search, and are cited as being of interest:

| U.S. PAT. NO.: | PATENTEE | ISSUE DATE |
| --- | --- | --- |
| 1,586,691 | T. E. Murray, Jr. | June 1, 1926 |
| 1,596,114 | T. E. Murray | August 17, 1926 |
| 1,860,346 | J. L. Anderson | May 31, 1932 |
| 3,965,555 | Webster et al | June 29, 1976 |
| 4,106,797 | Michael | August 15, 1978 |
| 4,522,432 | Press | June 11, 1985 |
| 4,681,349 | Press et al | July 21, 1987 |

Other objects and advantages of the present invention will become apparent to those of ordinary skill in the art as the description thereof proceeds.

SUMMARY OF THE INVENTION

A multi-branch fitting comprising: a one-piece multi-branch hollow liner having a plurality of individual confronting metal housing members assembled over the liner and disposed in confronting relation with each other; and a fillet weld bead integrally coupling the terminal ends of confronting mental housing members together. The invention also contemplates the method of fabricating a multi-branch fitting which includes the step of utilizing an elongate insulating tongue on a radially inner terminal end of one of the housing members for insulating a portion of the liner radially adjacent a radially inner slotted portion of the other metal housing members from weld heat applied to a radially outer portion of the other housing member.

DESCRIPTION OF THE DRAWINGS

The invention may be more readily understood by referring to the accompanying drawings, in which.

DESCRIPTION OF PREFERRED EMBODIMENT

Figure 1:
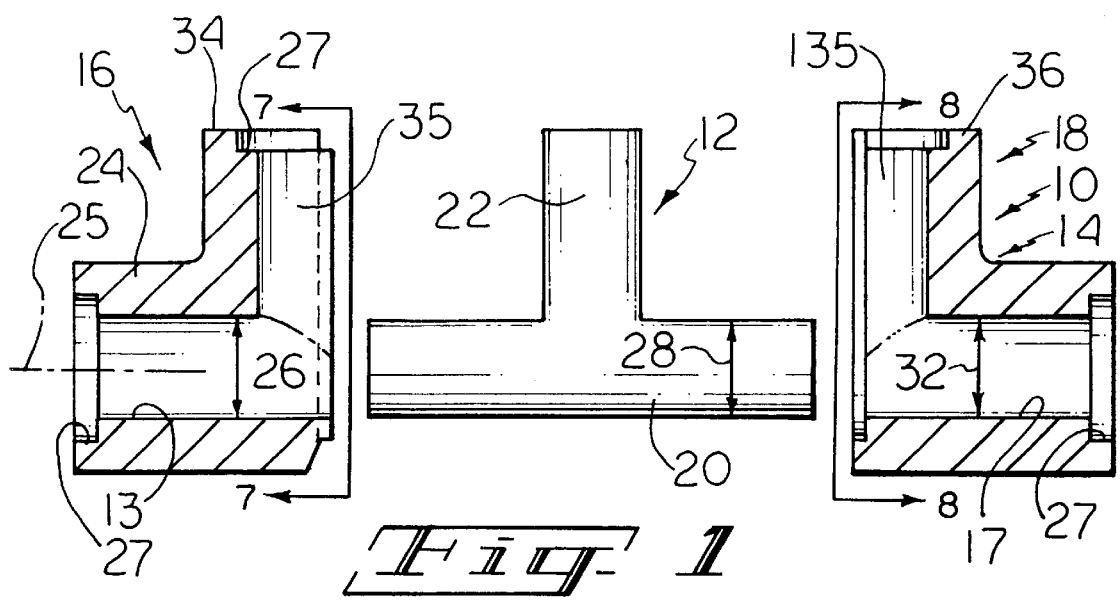
FIG. 1 is an exploded front exploded sectional view, taken along the section line 1—1 of FIG. 2, illustrating a multi-branch fitting constructed according to the invention including metal housing members disposed at opposite ends of a T-shaped liner prior to assembly.
Figure 2:
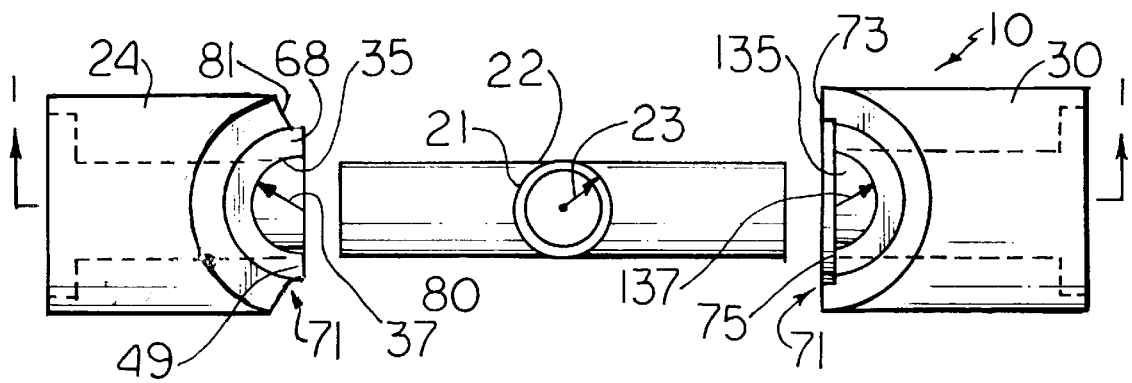
FIG. 2 is an exploded top plan view thereof.
Figure 3:
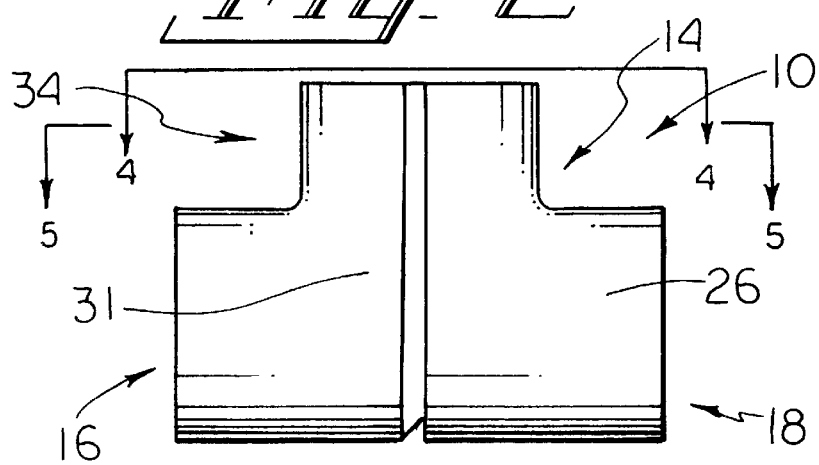
FIG. 3 is a front elevational view illustrating a multi-branch fitting constructed according to the present invention with the metal housing members assembled on the T-shaped liner prior to welding.
Figure 4:
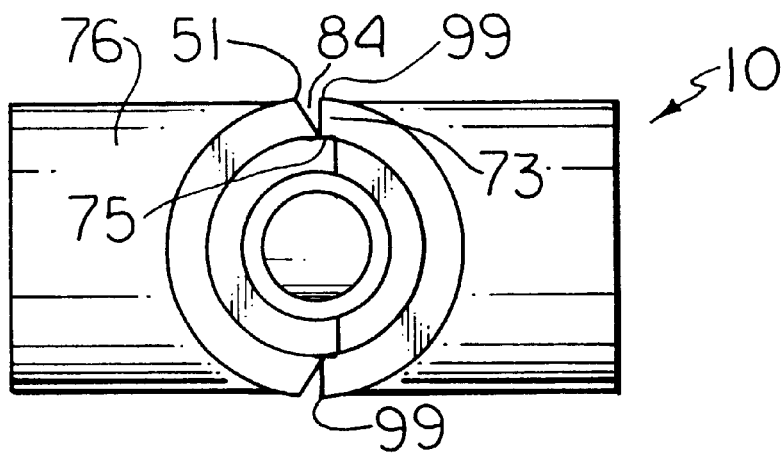
FIG. 4 is a top plan view, taken along the line 4—4 of the multi-branch fitting illustrated in FIG. 3.
Figure 5:
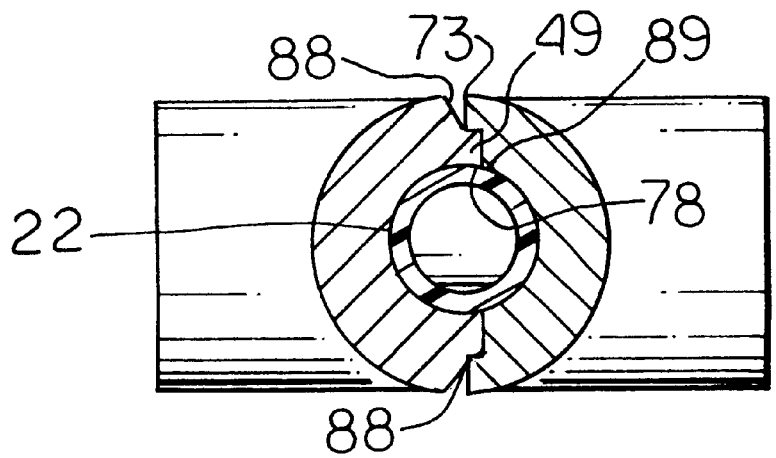
FIG. 5 is a top plan sectional plan view, taken along the section line 5—5 of FIG. 3.

A lined multi-branch fitting, constructed according to the present invention, generally designated 10, includes a one-piece multi-branch hollow liner, generally designated 12, of heat degradable material, such as glass or plastic, and a metal housing, generally designated 14, comprising a pair of metallic housing members 16 and 18 assembled over the liner 12.

The liner 12 includes a main cylindrical run 20 having a transversely disposed, integrally formed neck 22 defining inter-connected hollow cylindrical branches in fluid communication with each other. The neck 22 includes a cylindrical outer surface 21 having a radius 23.

The housing member 16 includes a main cylinder run 24 having an axis 25 and an inside surface 13 having an inside diameter 26 which is substantially equal to the outer diameter 28 of the main liner run 20 for slidably being received therein with a snug fit. The housing member 18 includes a similarly formed main cylinder 30, axially aligned with the cylinder 24, having an inside surface 17 including an inner diameter 32 identical to the inner diameter 26 for snugly receiving the opposite free end of the main liner run 20. The outer terminal ends 23 of the cylinders 24 and 30 are each countersunk at 27 for receiving an end portion of another plastic lined conduit or coupling member (not shown).

Integrally formed with the axially inner end 31 of metal housing member 16, is a transversely disposed, substantially semi-cylindrical metal half stack, generally designated 34, for generally mating with a half stack 36 which is integrally formed on the axially inner end 33 of cylinder 30.

The semi-cylindrical half stacks 34 and 36 include central, curvilinear, liner receiving, inner surfaces 35 and 135, respectively, having inside radii 37 and 137, respectively, which are each substantially equal to the outside radius 23 of liner neck 22 to snugly mate with opposite sides the liner neck 22 when assembled as illustrated in FIGS. 3–6.

Figure 9:
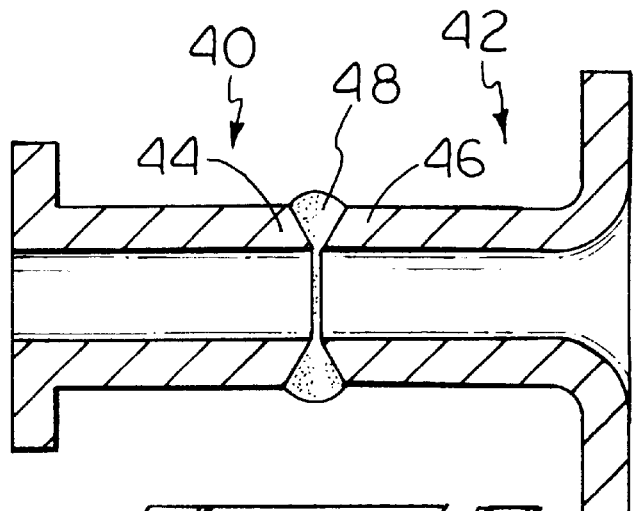
FIG. 9 is a sectional side view illustrating a typical prior art butt weld utilized to join mental parts of abutting metal parts of a fitting.

A main consideration in joining the metal housing members 16 and 18 together, is to weld their confronting ends 31 and 33 together without burning or degrading the interior, heat degradable liner 12 which is typically formed of plastic that will degrade at a substantially lower temperature than will the metal housing members 16 and 18. To better understand the problem, reference may be had to FIGS. 9–11. FIG. 9 illustrates a prior art welding process of coupling adjacent cylindrical metal parts 40 and 42 having abutting ends 44 and 46, respectively, which are welded together via a butt weld 48.

Figure 11:
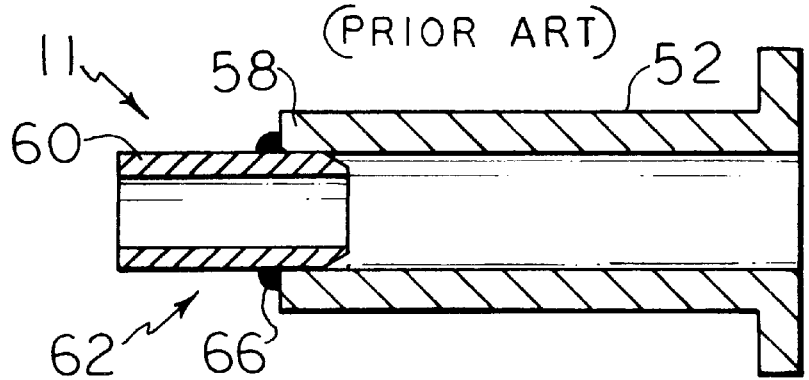
FIG. 11 is a sectional side view of a prior art fillet weld.

Building and construction codes frequently require that the butt weld 48 extend completely through the entire radial thickness of abutting ends 44 and 46, as illustrated in FIG. 9. Such butt welds must typically be x-rayed and spot checked for quality. The reject rate for such butt welded parts can be substantial and thus, costly. Also, relatively expensive labor is required to perform the butt welding operation illustrated in FIG. 9 compared to a fillet weld 66, such as illustrated in FIG. 11. FIG. 11 illustrates the coupling of the cylindrical end 58 of a cylinder 52 to the outer diameter surface 60 of another, smaller diameter metal cylinder 62 which are welded together via a fillet weld 66.

Fillet welds are preferable relative to butt welds to weld surfaces which are not abutting as they do not have to be x-rayed and do not require the 100% penetration weld as required by the butt weld illustrated in FIG. 9.

Figure 10:
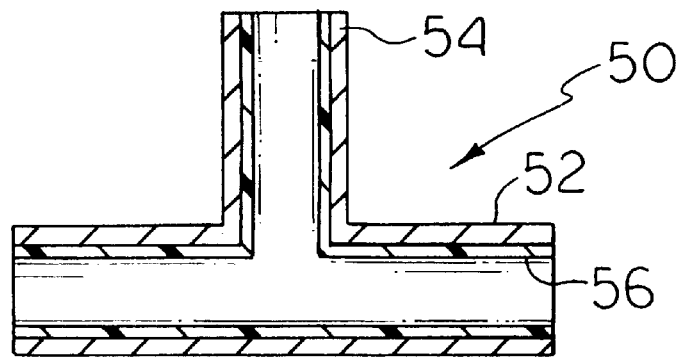
FIG. 10 is a sectional side view illustrating a prior art fitting having a liner molded therein.

The prior art illustrated in FIG. 10 illustrates a one-piece T-shaped metal housing, generally designated 50, having a hollow cylindrical metal run 52 coupled to a T-neck 54 and internally receiving a one-piece T-shaped molded liner 56. The molding operation required to line the housing 50 is relatively expensive.

The confronting inner ends 31 and 33 of metal housing members 16 and 18 respectively, include cooperating, radially inwardly disposed male and female parts, generally designated 68 and 70; respectively, which are complementally formed to provide an insulation barrier to weld heat applied to the metal housing member 18 from reaching the liner 12.

The housing member 18 includes an end face, generally designated 71 (FIG. 8), having a radially outer portion 73 and a radially inner slot portion 75 which is recessed to provide a radially inwardly opening notch for receiving the male part 68. As illustrated in end elevation in FIG. 8, the female slot or notch 70 is U-shaped and includes a lower semi-circularly shaped slot base 72 along the radially inner lower half of main cylinder 30 and disposed along the underside of the liner main run 20. The U-shaped slot 70 also includes parallel legs 77 which are immediately adjacent the radially inner edge 78 of half stack 36 on opposite sides of the adjacent radially outer surface of the liner neck 22.

Figure 8:
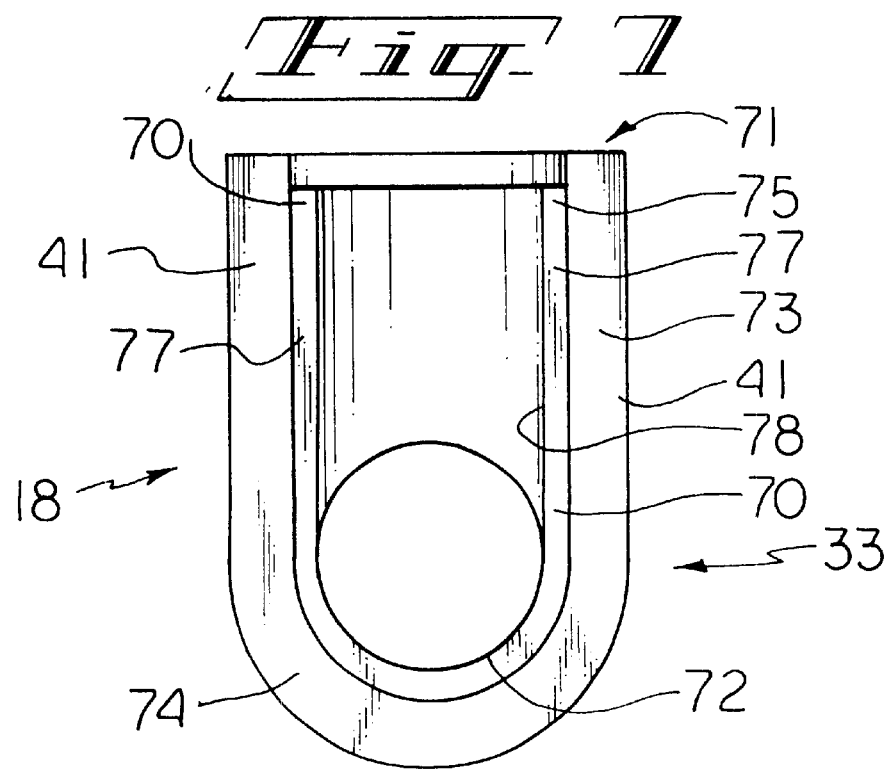
FIG. 8 is a slightly enlarged end elevational view of the other metal housing member taken along the line 8—8 of FIG. 1.

As illustrated in end elevation in FIG. 8, the radially outer end face portion 73 is also U-shaped and includes a lower semi-circularly shaped base 74 along the underside of the U-shaped slot base 72 and a pair of radially outer upstanding parallel legs 41 radially outwardly of slot legs 77.

Figure 6:
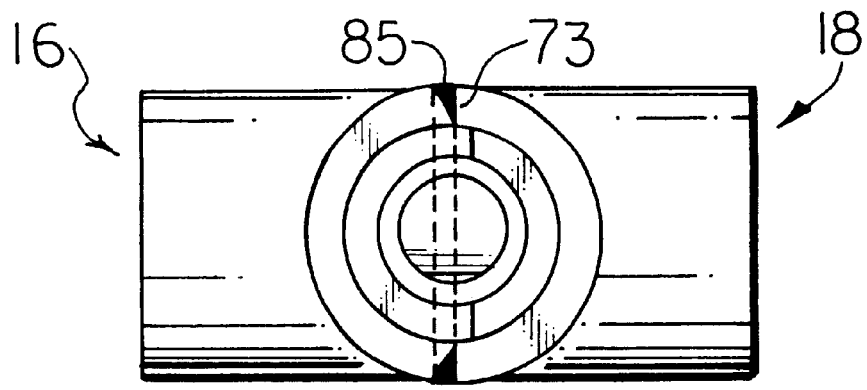
FIG. 6 is a top plan view similar to FIG. 4 but illustrating the lined multi-branch fitting constructed according to the present invention in a final stage of assembly with the confronting metal housing members welded together.
Figure 7:
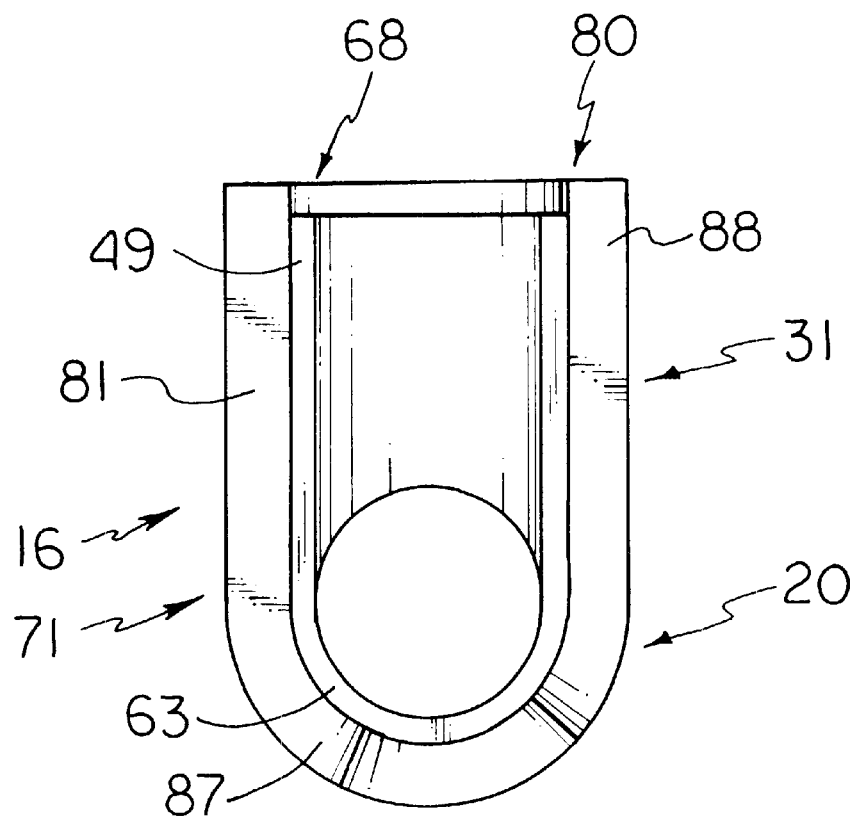
FIG. 7 is a slightly enlarged end elevational view of one of the metal housing members, taken along the line 7—7 of FIG. 1.

The metal housing member 16 includes an end face, generally designated 80 having, at the radially inner edge thereof, a radially inner, male projection, tongue or strip 68 and a radially outer face portion 81 which is recessed or relieved in a direction away from the tongue 68 to provide a weld metal recess 84 for receiving weld metal bead, generally designated 85, as illustrated in FIG. 6. The male tongue 68 comprises an integral bar which is U-shaped (FIG. 7) in the end view of FIG. 7 and is complementally formed to the trough or notch 70 cut into the end face 71 of part 18 so as to be snugly received thereby. The U-shaped male projection 68 includes a semi-circularly shaped base 63 along the radially inner, lower half of cylinder 24 disposed along the underside of the main liner run 20. The U-shaped bar 68 also includes a pair of generally parallel integral elongate male legs or tongues 49 formed along the radially inner portion 47 of half stack 34.

The radially outer end face 81 of metal housing member 16 is also U-shaped in end elevational (FIG. 7) and includes a semi-circular lower weld bead recess 87, along the undersides of cylinder 24 and the semi-circularly shaped notch base 63, and a pair of upstanding, parallel weld recess legs 88 provided in the radially outer edge of half stack member 34. The weld bead receiving legs 88 are diametrically opposed, parallel and recessed in a direction away from the elongate male bars or tongues 49 to form a part of the weld recess 84.

The radially outer end face portion 81 includes a radially outer terminal edge surface 51 (FIG. 4) which is flush with the radially outer surface 76 of main cylinders 30.

A fillet weld metal bead 85 (FIG. 6) fills the weld recess 84 between the radially outer end face portion 73 of metal housing member 18 and the recessed end face 81 of the metal housing member 16. The use of the fillet weld thus does not require a complete penetration of the adjoining parts and can minimize the labor required to weld the parts together.

To form the fillet weld bead 85, heat is applied at 99 to the radially outer portion 73 of metal housing member 18. More heat is applied to the radially outer surface 73 of metal housing member 18 than is applied to the metal housing member 16. The metal projection or tongue 68, and the gap formed by the notch 75, creates an insulating barrier to the radially inward passage of heat in a radially inward direction to the adjoining liner portion 89 adjacent the notch 70. In this manner, an insulating barrier is provided which prevents degredation of the liner 12 occasioned by the heat applied at 99 to weld the parts with the fillet weld bead 85.

Method

The method of assembly may be better understood by reference to FIGS. 1–8. The housing members 16 and 18 are formed as illustrated in FIGS. 1, 2, 7 and 8 with the insulating slot 70 cut into housing member 18 and complementally formed insulating bar 68 formed on the housing member 16. The recessed face 81 is cut into the housing member 16 to provide a weld recess 84 when the housing members are moved from the spaced apart positions, illustrated in FIGS. 1 and 2, to the adjacent mating positions illustrated in FIG. 4.

Initially, the metal housing members 16 and 18 are disposed at opposite ends of the heat degradable liner 12 with the cylinders 24 and 30 in axial alignment along axis 25. When the metal housing members 16 and 18 are moved toward each other to the adjacent mating positions illustrated in FIGS. 3 and 4, the male insulating bar 68 is snugly received in the female slot 70 and the liner neck 22 is snugly received by the mating half stacks 34 and 36.

Weld metal 85 is deposited into the weld recess 84 to bond the radially outer portion 73 of the metal housing member 18 to the metal housing member 16. The heat barrier created by the gap 75 and male projection 68 on housing member 16 inhibits the flow of heat applied at 99 on housing member 18 to the adjacent portion 89 of the liner radially inwardly adjacent the notch 70.

Alternate Embodiment

FIGS. 12, 12A, 12B and 13–15 disclosed a slightly modified multi-branch fitting, generally designated 10A, and generally similar parts will be referred to by generally similar reference characters followed by the letter A subscript.

The fitting 10A primarily differs from the fitting 10 in that rather than having two cylindrical parts with stack halves welded together to form a neck, the fitting 10A includes two axially aligned main cylinders 24A and 30A and a third perpendicularly disposed separate hollow metal cylinder 90.

Although the main cylinder lower half ends 31A and 33A, including the opposed lower half 104 and 102 of end faces 80A and 71A, respectively, of cylinders 24A and 30A, respectively, are identical to the lower half of ends 31 and 33, respectively, of fitting 10, the upper cylindrical halves, generally designated 94 and 95 of the main cylinders 24A and 30A, respectively, are cut away in upwardly oppositely directions, at 45° angles, as illustrated, to provide upwardly exposed semi-circular upper half end faces 96 and 98, respectively. The construction of the semi-circular upper half end faces 96 and 98, respectively, of the upper halves 94 and 95 of cylinders 24A and 30A, respectively, are identical to the lower half end faces except that they are relatively upwardly outwardly diverging in oppositely inclined directions, at 45° in front elevation.

The upper cylinder end face upper half 98 of cylinder 30A includes a semi-circular upper half female slot 106 identical to the lower half semi-circulars lot 72A. The lower half end face 71A also includes a semi-circular radially outer, lower half base portion 74A along the underside of the semi-circularly shaped slot base 72A. The upper cylinder end face half 98 also includes an identical, but inverted, semi-circularly shaped, radially outer end face portion 108 surrounding and contiguous with the semi-circular slot 106.

The upper half end face 96 of cylinder 24A includes a semi-circular male insulating projection 112 identical to the lower half semi-circular male projection 63A except that it is inverted relative thereto. The lower half end face 104 also includes a semi-circular, radially outer lower half base portion 87A along the underside of the lower half semi-circular insulating projection 63A. The upper cylinder end face half 98 also includes an identical, but inverted, semi-circularly shaped, radially outer end face portion 116.

The third cylinder 90 forms the neck of the fitting 10A. The cylinder 90 includes a lower terminal cylindrical terminal end, generally designated 118, provided with downwardly converging semi-circular left and right end face halves 121 and 122, respectively, which are inclined at a 45° angle relative to the axes 25A of main cylinders 24A and 30A. The lower left half end face half 121 includes a semi-circular female receptacle or slot 120 for receiving the male projection 112 on the upper half of cylinder 24A. The female slot 120 is semi-circular and is shaped to complementally receive the semi-circular strip or projection 112. The lower left half end face 121 also includes a semi-circular, radially outer flat end face portion 126, similar to end face portion 41, surrounding the semi-circular female slot 120 and confronting the relieved surface 116 on cylinder 24A.

The right half end face 122 of the lower end 118 of cylinder 90 includes a semi-circular male projection 124 for being complementally received in the semi-circular slot 106 on cylinder member 30A. The lower right half end face 122 also includes a semi-circular, radially outer recessed end face portion 128, similar to recessed face 81, surrounding the male projection 124, and confronting the relieved surface 108.

Figure 12:
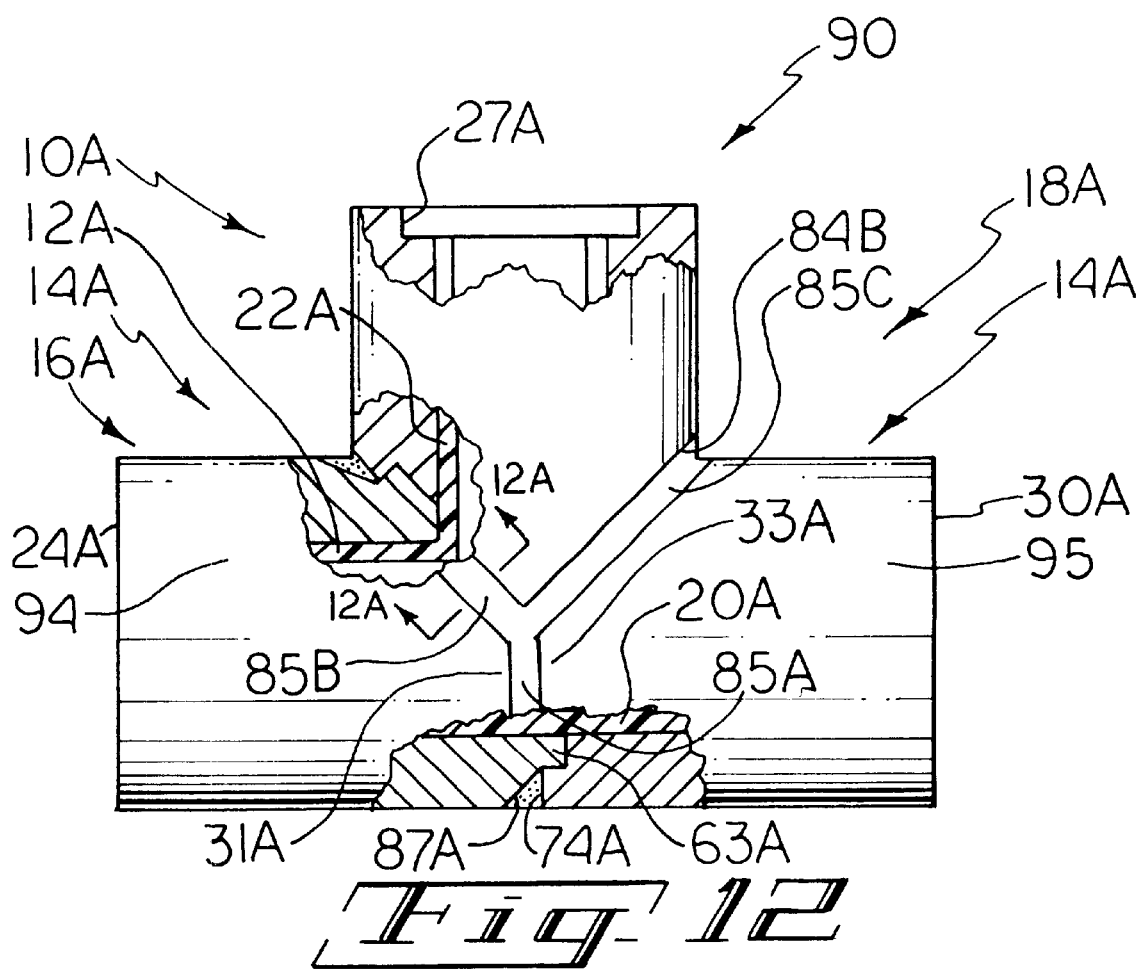
FIG. 12 is a side elevational view, partly in section, illustrating a slightly modified embodiment of an assembled fitting.
Figure 12A:
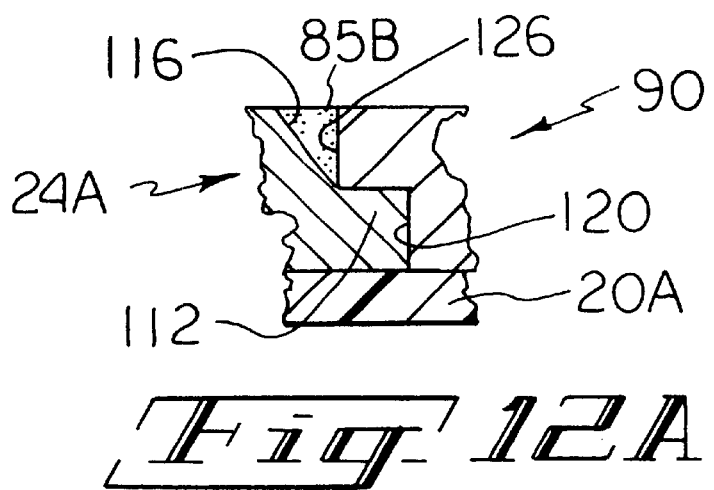
FIG. 12A is a greatly enlarged sectional view, taken along the section line 12A—12A of FIG. 12.
Figure 12B:
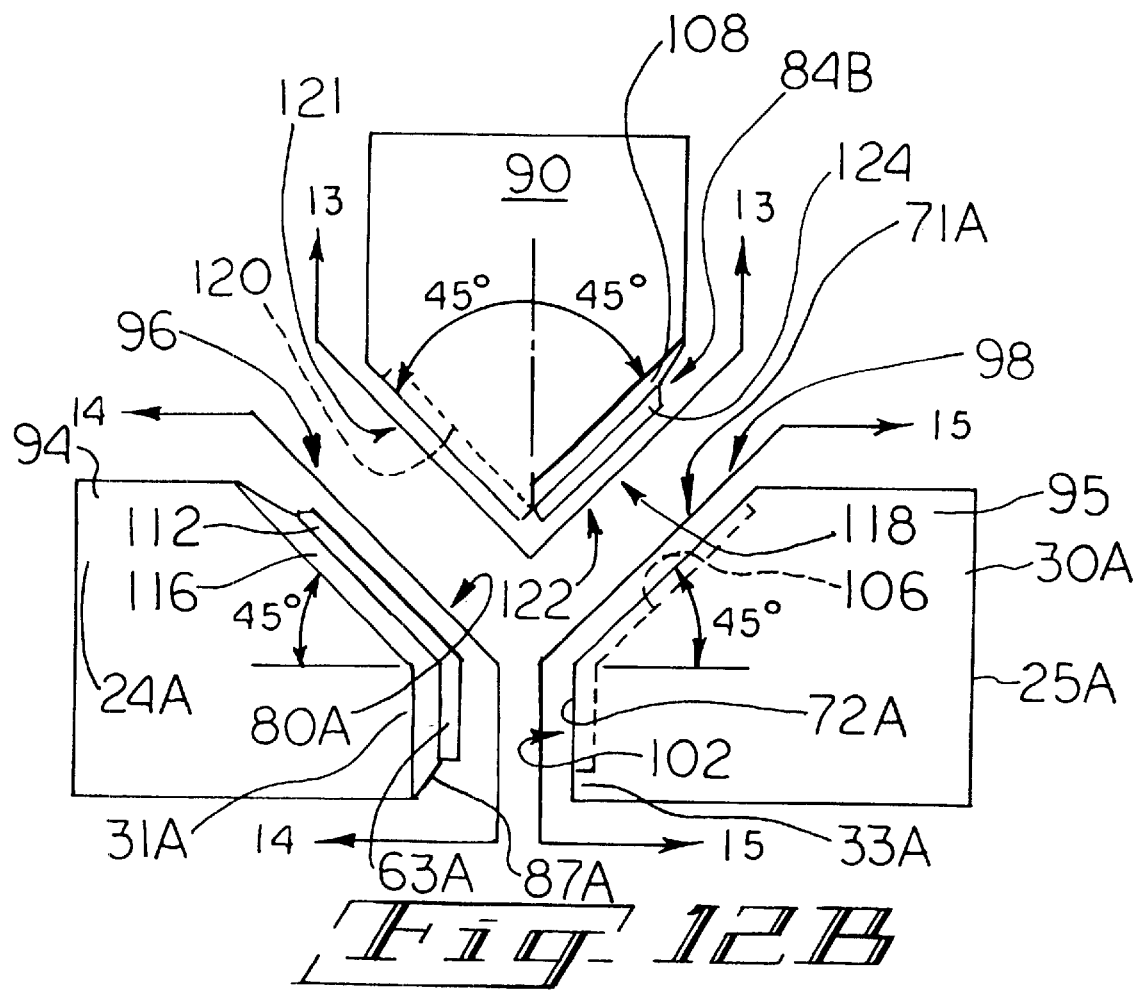
FIG. 12B is a fragmentary front exploded elevational view illustrating a three piece metal housing only prior to assembly on a T-shaped liner as illustrated in FIG. 12A.
Figure 13:
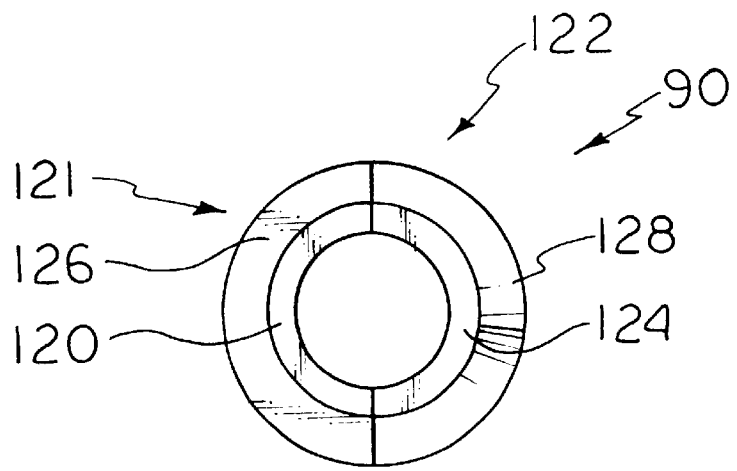
FIG. 13 is an underside view, taken along the line 13–13 of FIG. 12B.
Figure 14:
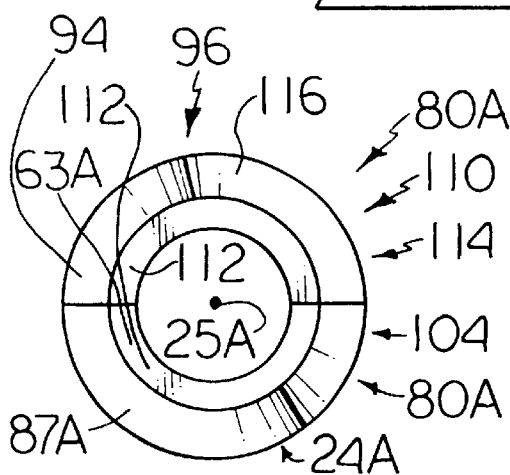
FIG. 14 is an end elevational view, taken along the line 14—14 of FIG. 12B.
Figure 15:
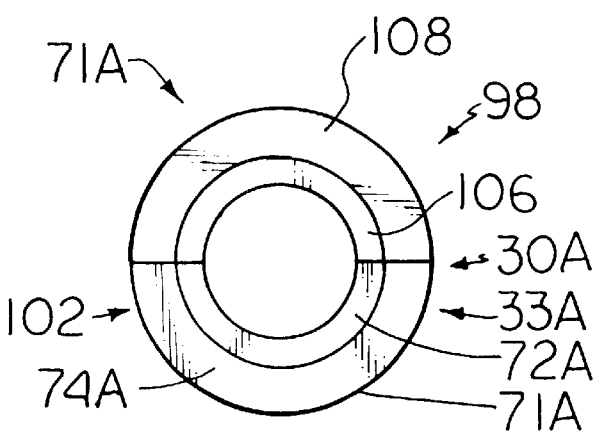
FIG. 15 is an end elevational view taken along the line 15—15 of FIG. 12B.

The process of manufacturing the fitting 10A includes disposing cylinders 24A and 30A over opposite ends of the main liner run 20A of the liner 12A to the positions illustrated in FIG. 12 so that the insulating semi-circular insulating projections 63A on cylinder 24A are received by the semi-circular slot 72A on cylinder 30 adjacent the main liner run 20A.

The third cylinder 90 is disposed over the neck 22A of the liner 12A to the position illustrated in FIG. 12 in which the semi-circular male insulating projection 112 on cylinder 24A is received in the semi-circular female slot 120 on cylinder 90 and the male semi-circular insulating projection 124 on the lower right end of cylinder 90 is snugly received in the semi-circular upper half slot 106 of cylindrical member 30A. The adjacent confronting portions of the cylinders 24A, 30A and 90 are welded integrally together via thru integral semi-circular weld bead 85A, 85B and 85C.

The neck is thus formed by a separate metal cylindrical member 90 having a lower cylindrical terminal end 118 provided with a semi-circular female slot 120 on the left half of the lower end 118 that joins with the semi-circular male insulating strip 112 on upper half of the main cylinder 24A. The right half of the lower end 118 of the cylinder 90 includes a semi-circular male projection 122 for being received in a complementally formed notch 106 in the upper half end face 98 of the right hand main run cylinder 30A. The parts includes similar formed radially inner and outer end face portions which are notched similar to that illustrated in FIGS. 1–8. Likewisely, the metal housing member 24A, and the right lower half end face 122 are formed with radially outer recesses 84A and 84B, respectively, for receiving the weld metal beads 85A, 85B and 85C, respectively.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

What we claim is:

1. A lined multi-branch fitting comprising:
    a one-piece multi-branch hollow liner having a plurality of intersecting non-metallic hollow cylindrical branches in fluid communication with each other;
    a plurality of individual confronting metal housing members, assembled over and snugly receiving said non-metallic branches, having confronting terminal ends disposed in confronting relation with each other; and
    a fillet weld bead integrally coupling said terminal ends of said confronting terminal ends of said metal housing members together in sealed relation with each other;
    said metallic housing members each comprising a radially inner portion having a radially inner surface snugly receiving said liner and a radially outer portion having a radially outer surface; said radially inner portion of one of said housing members including an end face provided with a notch adjacent said liner; said inner portion of the other of said confronting metallic housing members including a confronting end face housing, a male projection complementally formed to, and received by, said notch, and abutting said liner.

2. The lined multi-branch fitting set forth in claim 1 wherein said fillet weld bead is disposed radially outwardly of said male projection.

3. The lined multi-branch fitting set forth in claim 2 wherein said radially outer portions each includes a terminal end face; said terminal end face of said metallic housing member which includes said male projection being relieved in a direction away from said male projection to provide a radially outwardly opening recess for receiving said fillet weld bead.

4. A lined multi-branch fitting comprising:
    a one-piece multi-branch hollow liner having a plurality of intersecting non-metallic hollow cylindrical branches in fluid communication with each other;
    a plurality of individual confronting metal housing members, assembled over and snugly receiving said non-metallic branches, having confronting terminal ends disposed in confronting relation with each other; and
    a fillet weld bead integrally coupling said terminal ends of said confronting terminal ends of said metal housing members together in sealed relation with each other;
    said metallic housing members each including a radially inner portion having a radially inner surface snugly receiving said liner and a radially outer portion;
    said radially inner portions including complementally formed nested male and female terminal end portions.

5. The lined multi-branch fitting set forth in claim 4 wherein said weld bead is radially outward of said male projection.

6. The lined multi-branch fitting set forth in claim 5 wherein said radially outer portions each includes a terminal end face; said terminal end face of said metallic housing member which includes said projection being circumferentially relieved in a direction away from said male projection to provide a radially outwardly opening recess for receiving said fillet weld bead.

7. A lined multi-branch fitting comprising:
a one-piece multi-branch hollow liner having a plurality of intersecting non-metallic hollow cylindrical branches in fluid communication with each other;
a plurality of individual confronting metal housing members, assembled over and snugly receiving said non-metallic branches, having confronting terminal ends disposed in confronting relation with each other; and
a fillet weld bead integrally coupling said terminal ends of said confronting terminal ends of said metal housing members together in sealed relation with each other;
one of said confronting terminal ends comprising a radially outer arcuate portion having a first end face and an integral, radially inner, liner receiving arcuate portion having a terminal male projection which projects beyond said first terminal end face of said radially outer arcuate portion;
said male projection including a second terminal end face; another of said confronting terminal ends comprising a second radially outer arcuate portion having a third terminal end face and an integral, radially inner, liner receiving arcuate portion having a fourth terminal end face which is recessed relative to said third end face to form a notch for complementally receiving said male projection;
said second terminal end face being disposed in abutting relation with said fourth terminal end face.

8. The lined multi-branch fitting set forth in claim 7 wherein said first terminal end face is relieved in a direction away from said third end face to provide a radially outwardly opening weld recess for receiving said fillet weld bead.

9. The lined multi-branch fitting set forth in claim 7 wherein said radially outer and inner arcuate portions of one confronting terminal end have first and second radial thicknesses, respectively; said radially inner and outer arcuate portions of the other confronting terminal end have third and fourth radial thicknesses, respectively, substantially equal to said first and second radial thicknesses, respectively; said fillet weld bead integrally fusing said radially outer portion of said other confronting terminal end confronting metallic member to said radially inner portion of said one confronting terminal end.

10. A lined multi-branch fitting comprising:
a one-piece multi-branch hollow liner having a plurality of intersecting non-metallic hollow cylindrical branches in fluid communication with each other;
a plurality of individual confronting metal housing members, assembled over and snugly receiving said non-metallic branches, having confronting terminal ends disposed in confronting relation with each other; and
a fillet weld bead integrally coupling said terminal ends of said confronting terminal ends of said metal housing members together in sealed relation with each other;
said liner including a hollow cylindrical base having opposite ends and a transversely disposed integral cylindrical neck projecting from said cylindrical base between said opposite ends;
said confronting metallic housing members including confronting, elongate hollow cylindrical metal bases receiving said opposite ends of said liner, and confronting substantially semi-cylindrical transversely extending, integral neck portions, integral with said cylindrical metal bases, receiving opposite sides of said cylindrical neck of said liner;
said metallic housing members each including radially inner arcuate portions of a predetermined radial thickness and having a radially inner surface snugly receiving said liner and radially outer arcuate portions of a second predetermined radial thickness having a radially outer surface;
said radially inner arcuate portion of one of said metallic housing members including an end face provided with an elongate notch adjacent said liner;
said radially inner portion of the other of said confronting metallic housing members including an elongate male strip projection complementally received by said notch and abutting said liner;
said radially outer portion of said other metallic housing member being relieved in a direction away from said radially inner male strip projection to provide a radially outwardly opening weld bead receiving opening receiving said weld bead.

11. The multi-branch fitting set forth in claim 10 wherein said elongate male strip projection provides a heat barrier to partially inhibit the transmission of heat from said radially outer arcuate portion of said one metallic housing member to said liner.

12. A lined multi-branch fitting comprising:
a one-piece multi-branch hollow liner having a plurality of angularly related, intersecting hollow branches, each having an axis, in fluid communication with each other;
a plurality of metal housing members, assembled about different ones of said hollow branches, having confronting terminal ends disposed in confronting relation with each other;
said confronting terminal ends including complementally formed radially inner female and male parts which mate with each other and snugly receive said liner;
said confronting metal housing members including radially outer portions having terminal end portions radially outwardly of said radially inner portions;
said radially outer terminal end portions of said metal housing member which includes said male part being circumferentially relieved radially outwardly of said male part in a direction away from said male part to provide a radially outwardly opening weld recess; and
a weld metal bead received in said weld recess radially outwardly of said mating female and male parts for welding said confronting terminal ends together.

13. The lined multi-branch fitting set forth in claim 12 wherein said weld bead comprises a fillet weld bead.

14. A lined multi-branch fitting comprising:
a one-piece multi-branch hollow liner having a plurality of intersecting non-metallic hollow cylindrical branches in fluid communication with each other;
a plurality of individual confronting metal housing members, assembled over and snugly receiving said non-metallic branches, having confronting terminal ends disposed in confronting relation with each other; and
a fillet weld bead integrally coupling said terminal ends of said confronting terminal ends of said metal housing members together in sealed relation with each other;
said confronting terminal ends including radially inner and outer portions, said radially inner portion of said confronting end of one of said metal housing members including heat barrier means for inhibiting weld heat generated in a radially outer portion of said confronting end of the other of said metal housing members, as said fillet weld bead is being formed, from transferring to said liner;

said heat barrier means comprising a male projection on said one of said confronting metallic housing members and cooperating female notch on another of said other confronting metal housing members receiving said male projection.

15. A lined multi-branch fitting comprising:

a one-piece multi-branch hollow liner having a plurality of intersecting non-metallic hollow cylindrical branches in fluid communication with each other;

a plurality of individual confronting metal housing members, assembled over and snugly receiving said non-metallic branches, having confronting terminal ends disposed in confronting relation with each other; and a fillet weld bead integrally coupling said terminal ends of said confronting terminal ends of said metal housing members together in sealed relation with each other;

insulating means, integrally formed on a radially inner portion of said confronting terminal end of one of said housing members, for insulating a portion of said liner adjacent a radially inner portion of said terminal end of another of said confronting housing members from weld bead applied to a radially outer portion of said terminal end of said other housing member;

said insulating means comprising a radially inner strip projecting in a direction outwardly away from said terminal end of said one housing member to a position between said liner portion and said radially inner end portion of said another metal housing member;

said radially inner end portion of said another metal housing member comprising a radially inwardly opening notch provided in said radially inner portion of said terminal end face of said another metal housing member.

16. In a multi-branch fitting having a metal housing lined with a one-piece non-metallic hollow multi-branch liner having a plurality of angularly related hollow cylindrical ends; said metal housing comprising:

a plurality of individual metal housing members which are disposed over said plurality of hollow ends in a confronting relation with each other;

each of said metal housing members including
a radially outer arcuate portion, and
an integral radially inner arcuate portion having radially inner surfaces snugly receiving said liner; said radially inner arcuate portions of adjacent confronting metal housing members including complementally formed male and female parts disposed in nested relation with each other; and a fillet weld metal bead disposed radially outwardly of said male and female parts coupling said confronting metal housing members together.

17. The multi-branch fitting set forth in claim 16 wherein said radially outer arcuate portion of said metal housing member which includes said male part being circumferentially relieved in a direction away from said male part to provide a radially outwardly opening weld recess for receiving said weld metal bead.

18. A lined multi-branch fitting comprising:

a one-piece multi-branch hollow non-metallic liner of heat degradable material having at least three intersecting hollow cylindrical branches in fluid communication with each other;

a plurality of metal housing members assembled about said hollow cylindrical branches and having complementally formed radially inner portions snugly receiving said hollow branches and radially outer portions disposed in confronting relation with each other;

one of said radially inner portions having
a terminal end defining a circumferentially extending male strip projection; the other of said radially inner portions having a circumferentially extending radially inwardly opening notch complement to said male strip projection snugly receiving said male strip projection;

said radially outer portions including terminal ends, one of said terminal ends being circumferentially recessed relative to the other terminal end to provide a radially outwardly opening weld recess therebetween; and a fillet weld received in said recess for welding said outer portion of one housing member to the inner portion of the other housing member.

19. A lined multi-branch fitting comprising:

a preformed one-piece liner of heat degradable material having a plurality of intersecting non-metallic, hollow cylindrical branches in fluid communication with each other;

a plurality of metal housing members assembled about said preformed liner including adjacent inner ends each having radially outer and radially inner end portions;

a fillet weld bead joining a radially outer portion of one of said housing members to the other of said housing members; and insulating means on said radially inner end portion of one of said housing members for insulating a portion of said liner adjacent said radially inner portion of said one housing member from any heat in said radially outer portion of said one housing member;

said insulating means comprising a radially inwardly opening notch provided in said radially inner end portion of said one housing member and a male projection on said radially inner end portion of said other housing member received by said notch and abutting said liner.

20. The lined multi-branch fitting set forth in claim 19 wherein said plurality of metal housing members comprise two axially aligned, hollow cylinders having axially inner confronting ends; each of said inner ends including a transversely disposed, substantially semi-cylindrical, metal half stack for mating with the other half stack to form a cylindrical stack.

21. The lined multi-branch fitting set forth in claim 20 wherein said radially outer portion of said one housing member includes a radially outwardly opening weld grove and wherein said plurality of metal housing members comprise two axially aligned hollow cylinders and a transversely disposed, hollow cylindrical stack.

22. A lined multi-branch fitting comprising:

a one-piece multi-branch hollow liner having a plurality of intersecting non-metallic hollow cylindrical branches in fluid communication with each other;

a plurality of individual confronting metal housing members, assembled over and snugly receiving said non-metallic branches, having confronting terminal ends disposed in confronting relation with each other; and a fillet weld bead integrally coupling said terminal ends of said confronting terminal ends of said metal housing members together in sealed relation with each other;

one of said confronting ends including
- a radially outer end portion having a first radially outer end face, and
- a radially inner end portion having a first radially inner end face relieved relative to said radially outer end face to define a radially inwardly opening, radially inner notch;

the other of said confronting ends including
- a radially outer end portion having a second radially outer end face, confronting but spaced from said first outer end face to define a weld channel therebetween for receiving said fillet weld, and
- a radially inner end portion received by said notch having a second radially inner end face projecting outwardly beyond said second radially outer face and disposed in abutting relation with said first radially inner end face.

23. A lined multi-branch fitting comprising:

first and second metallic structural members assembled to form a hollow cylindrical base with opposite ends and a transversely disposed cylindrical neck projecting from said base between said opposite ends;

said structural members each having a terminal end disposed in confronting relation with the terminal end of the other structural member;

a one-piece T-shaped hollow liner of heat degradable material having a plurality of intersecting hollow branches in fluid communication with each other, lining the surface of said first and second metallic members;

said terminal end of said first metallic member having a radially inner edge having a radially inner, radially inwardly opening, female recess radially inwardly adjacent a radially outer elongate projection;

said terminal end of said second metallic member including:
- a radially inner edge having a projecting tongue bearing against said liner and received by said female recess, and
- a radially outer, annularly extending weld recess radially outwardly of said projecting tongue, confronting said radially outer elongate projection; and
- weld metal received in said weld recess to provide an annular fillet weld bead welding said first and second metallic structural members together.

24. A lined multi-branch fitting comprising:

a one-piece multi-branch non-metallic liner having a plurality of intersecting hollow cylindrical branches in fluid communication with each other;

a plurality of metal housing members assembled about said hollow branches including,
- radially inner complementally formed, confronting terminal end portions disposed in abutting relation and snugly receiving said liner; and
- radially outer portions having terminal end faces, one of said faces being recessed relative to the other terminal end face to provide a radially outwardly opening weld recess; and an annular bead of weld metal received in said weld recess radially outwardly of said inner portions to secure said metal housing members together;

said radially inner portion of one of said metal housing members including a radially inwardly opening notch and the radially inner portion of the other of said metal housing members comprises a male strip projection complementally received by said notch; said one end face on said other metallic housing member being recessed to provide said radially outwardly opening weld recess.

* * * * *